United States Patent
Ito

(10) Patent No.: US 12,250,355 B2
(45) Date of Patent: Mar. 11, 2025

(54) IMAGE PROCESSING APPARATUS, IMAGE PROCESSING METHOD, AND STORAGE MEDIUM FOR GENERATING A NAME USING CHARACTERS RECOGNIZED IN IMAGE DATA

(71) Applicant: Canon Kabushiki Kaisha, Tokyo (JP)

(72) Inventor: Keisuke Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/166,549

(22) Filed: Feb. 9, 2023

(65) Prior Publication Data
US 2023/0283733 A1    Sep. 7, 2023

(30) Foreign Application Priority Data
Mar. 3, 2022 (JP) ................. 2022-032808

(51) Int. Cl.
*H04N 1/32* (2006.01)
*G06F 16/16* (2019.01)
*G06V 30/18* (2022.01)
*H04N 1/00* (2006.01)

(52) U.S. Cl.
CPC ....... *H04N 1/32358* (2013.01); *G06F 16/166* (2019.01); *G06V 30/18* (2022.01); *H04N 1/00244* (2013.01); *H04N 1/00331* (2013.01); *H04N 1/00344* (2013.01); *H04N 2201/0094* (2013.01); *H04N 2201/3295* (2013.01)

(58) Field of Classification Search
CPC .......................... G06V 30/18; H04N 1/00331
See application file for complete search history.

(56) References Cited

U.S. PATENT DOCUMENTS

| | | | | |
|---|---|---|---|---|
| 6,104,500 A | * | 8/2000 | Alam ................. | H04N 1/32411 |
| | | | | 382/229 |
| 2018/0232069 A1 | * | 8/2018 | Krishnakumar ...... | G06F 3/0488 |
| 2021/0097275 A1 | * | 4/2021 | Miyauchi ............. | G06V 30/412 |
| 2021/0227082 A1 | * | 7/2021 | Mori ................... | H04N 1/00331 |
| 2022/0100954 A1 | * | 3/2022 | Sakamoto ............ | G06F 40/174 |

FOREIGN PATENT DOCUMENTS

| | | | | |
|---|---|---|---|---|
| EP | 4060512 A1 | * | 9/2022 | .......... G06F 16/164 |
| JP | 2019144854 A | | 8/2019 | |

* cited by examiner

*Primary Examiner* — Peter K Huntsinger
(74) *Attorney, Agent, or Firm* — Venable LLP

(57) ABSTRACT

An information processing apparatus is provided. The apparatus generates a name using characters recognized in image data, assign the name to the image data, and store the image data; makes a request for approval by a user regarding the name, transmit the image data to an external apparatus after the image data is approved by the user, and deletes the image data; in a case where the image data has exceeded a predetermined storage period without the name being approved by the user, in a case where the name satisfies a predetermined condition, transmits the image data to the external apparatus before deleting the image data; and deletes the image data that has exceeded the predetermined storage period without the name being approved by the user.

11 Claims, 11 Drawing Sheets

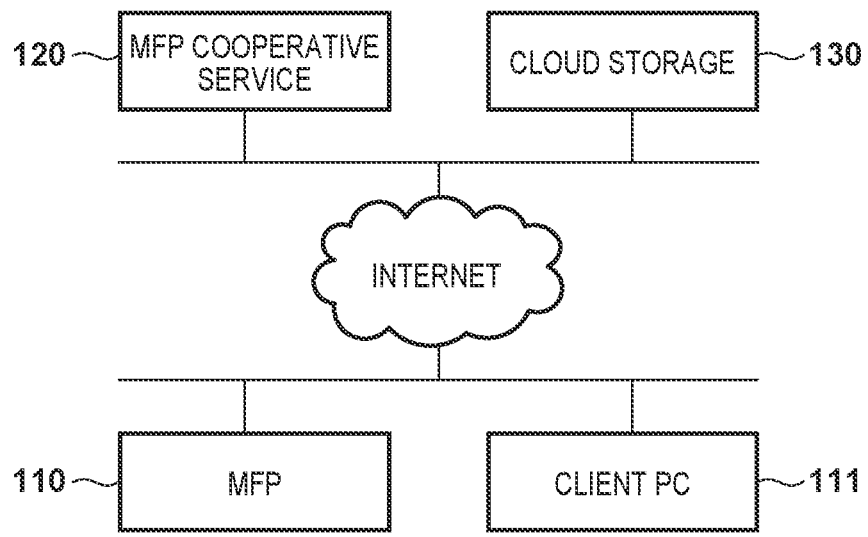
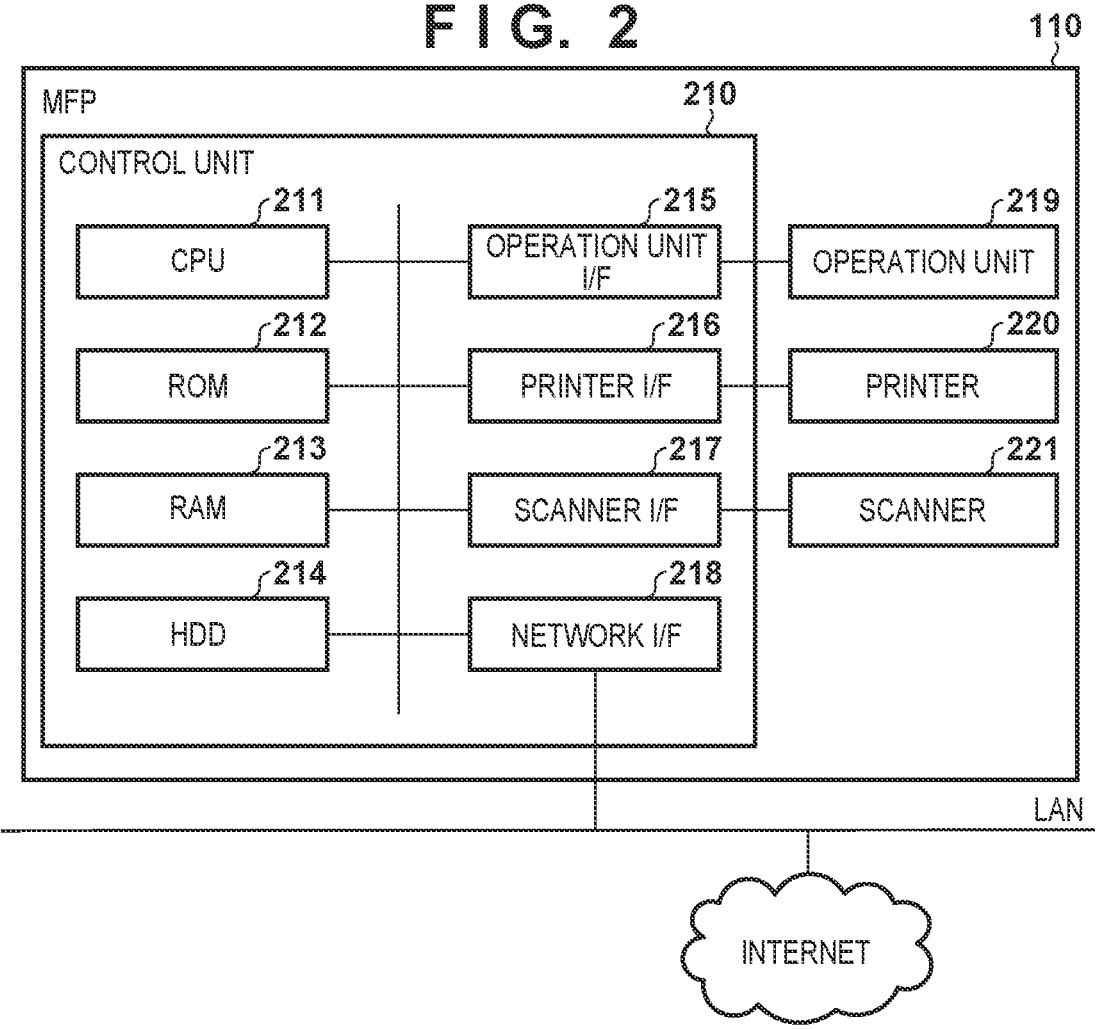

CASE WHERE EXTRACTED ENTITY REGION IS INCORRECT

CREATED FILE NAME:
INVOICE-CCC TRADING-2021/6/3.pdf

CASE WHERE OCR RESULT OF CHARACTER STRING IS INCORRECT

CREATED FILE NAME
:INVOICE-AAB CO., LTD.-2021/6/3.pdf

IMAGE PROCESSING APPARATUS, IMAGE PROCESSING METHOD, AND STORAGE MEDIUM FOR GENERATING A NAME USING CHARACTERS RECOGNIZED IN IMAGE DATA

BACKGROUND OF THE INVENTION

Field of the Invention

The present invention relates to an image processing apparatus for filing, for example, a document image or the like, an image processing method, and a medium.

Description of the Related Art

Conventionally, there have been cases where data resulting from scanning and digitizing a document using a multifunction peripheral (MFP) or the like is stored in a storage of a cloud service with a file name automatically created by a cloud image-processing service based on text of the document. When the file name is automatically-created, a user may be asked to confirm the file name. Specifically, an email including a URL for confirmation is transmitted to an email address of a logged-in user of the MFP, and the user is prompted to confirm the file name on a web page, which is a destination of the URL link. When approval is obtained from the user, the file that was temporarily stored on the cloud image-processing service is transmitted to another cloud service after being assigned the file name and then stored in a storage on that service.

At this time, if approval has not been granted by the user before an expiration date, the stored file is deleted. This makes it possible to prevent a storage capacity of the storage on the cloud image-processing service from being depleted. However, the file may be deleted without the knowledge of the user, and to prevent that, there is a technique in which when the end of a storage period is reached for a file, the file is deleted after transmitting an email to which the file is attached to the user (see Japanese Patent Laid-Open No. 2019-144854).

Files that have not been approved by the user by the expiration date are not stored in the storage of the cloud service, which is a storage destination. Therefore, for all of these files, the user has to manually reassign the file name and store the file, which takes time and effort.

SUMMARY OF THE INVENTION

The present invention efficiently digitizes documents by reducing the number of files whose file name a user needs to confirm.

According to one aspect of the present invention, there is provided an information processing apparatus comprising: one or more memories configured to store one or more programs; and one or more processors, wherein the one or more processors are caused by the one or more programs to: generate a name using characters recognized in image data, assign the name to the image data, and store the image data; make a request for approval by a user regarding the name, transmit the image data to an external apparatus after the image data is approved by the user, and delete the image data; in a case where the image data has exceeded a predetermined storage period without the name being approved by the user, in a case where the name satisfies a predetermined condition, transmit the image data to the external apparatus before deleting the image data; and delete the image data that has exceeded the predetermined storage period without the name being approved by the user.

According to the present invention, it is possible to efficiently digitize documents by reducing the number of files whose file name a user needs to confirm.

Further features of the present invention will become apparent from the following description of exemplary embodiments with reference to the attached drawings.

BRIEF DESCRIPTION OF THE DRAWINGS

FIG. 1 is a diagram illustrating an overall configuration of the present system.

FIG. 2 is a diagram of a hardware configuration of an MFP.

DESCRIPTION OF THE EMBODIMENTS

Figure 3:
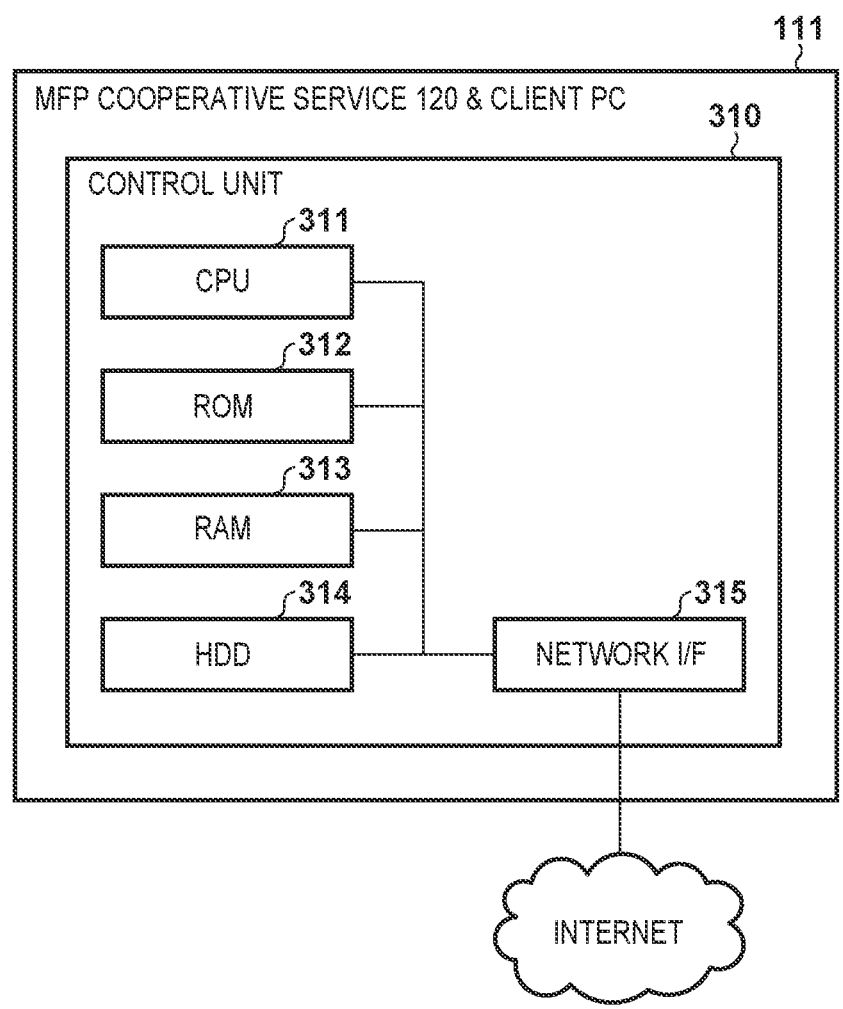
FIG. 3 is a diagram of a hardware configuration of a client PC and an MFP cooperative service.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

<Overall Configuration>

FIG. 1 is a diagram illustrating an overall configuration of the present system. An image processing system includes a multifunction peripheral (MFP) 110, a client PC 111, an MFP cooperative service 120, and a cloud storage 130. The MFP 110 and the client PC 111 are connected with a server, which provides various services on the Internet, via a local area network (LAN) so as to be capable of communication.

The MFP 110 is a multifunction device that includes a plurality of functions, such as a scanner and a printer, and is an example of an image processing apparatus or an information processing apparatus. The client PC 111 is a computer that receives provision of a service requested of the MFP cooperative service 120. A client application that is to be executed on the client PC 111 is sometimes referred to as a client. The MFP cooperative service 120 is an example of a service that includes a function of temporarily storing an image file scanned by the MFP 110 in its storage and a function of transferring the file to a service capable of file storage, such as another storage service. The cloud storage 130 is a service in which a file can be stored via the Internet and from which a stored file can be obtained via a web browser.

Although it is assumed that the image processing system of the present embodiment is configured by the MFP 110, the client PC 111, the MFP cooperative service 120, and the cloud storage 130, the present invention is not limited to this. For example, the MFP 110 may also be provided with functions of the client PC 111 and the MFP cooperative service 120. In addition, a form of connection may be such that the MFP cooperative service 120 is arranged in a server on the LAN instead of the Internet. In addition, the cloud storage 130 may be replaced with a mail server or the like, and a scanned image may be transmitted attached to an email. Alternatively, functions performed by one device in the present or other embodiments may be performed by a combination of functions of a plurality of devices.

<Hardware Configuration of MFP>

FIG. 2 is a diagram of a hardware configuration of the MFP 110. The MFP 110 is configured by a control unit 210, an operation unit 219, a printer unit 220, and a scanner unit 221. The control unit 210 is configured by each of the units 211 to 219 described below and controls an operation of the MFP 110 overall. The CPU 211 executes and controls various functions of the MFP 110, such as reading, printing, and communication, by reading out a control program stored in the ROM 212. The RAM 213 is used as a temporary storage region, such as a main memory and a work area of the CPU 211. In the present embodiment, it is assumed that one CPU 211 executes each process indicated in a flowchart to be described later using one memory (the RAM 213 or the HDD 214); however, the present invention is not limited to this. For example, each process may be executed by a plurality of CPUs and a plurality of RAMs or HDDs cooperating.

The HDD 214 is a large capacity storage unit for storing image data and various programs. An operation unit I/F 215 is an interface for connecting the operation unit 219 and the control unit 210. The operation unit 219 is provided with a touch panel, a keyboard, and the like and accepts an operation, input, or an instruction by the user. A printer I/F 216 is an interface for connecting the printer unit 220 and the control unit 210. Image data for printing is transferred from the control unit 210 to the printer unit 220 via the printer I/F 216 to be printed on a printing medium.

A scanner I/F 217 is an interface for connecting the scanner unit 221 and the control unit 210. The scanner unit 221 reads a document set on a document table or an auto document feeder (ADF) (not illustrated) to generate image data and then inputs the image data to the control unit 210 via the scanner I/F 217. The MFP 110 can print out (copy) image data generated by the scanner unit 221 from the printer unit 220 as well as transmit the image data in a file or by email. A network I/F 218 is an interface for connecting the control unit 210 (the MFP 110) to the LAN. The MFP 110 uses the network I/F 218 to transmit image data and information to a respective service on the Internet and receive various types of information.

<Hardware Configuration of Client PC and MFP Cooperative Service>

FIG. 3 is a diagram of a hardware configuration of the client PC 111 and the MFP cooperative service 120. The client PC 111 and the MFP cooperative service 120 are configured by a CPU 311, a ROM 312, a RAM 313, an HDD 314, and a network I/F 315. The CPU 311 controls the entire operation by reading out a control program stored in the ROM 312 and executing various processes. The RAM 313 is used as a temporary storage region, such as a main memory and a work area of the CPU 311. The HDD 314 is a large capacity storage unit for storing image data and various programs. The network I/F 315 is an interface for connecting the MFP cooperative service 120 to the Internet. Upon receiving a processing request from another device (such as the MFP 110) via the network I/F 315, the MFP cooperative service 120 and the cloud storage 130 transmit and receive various kinds of information.

<Software Configuration of Image Processing System>

Figure 4:
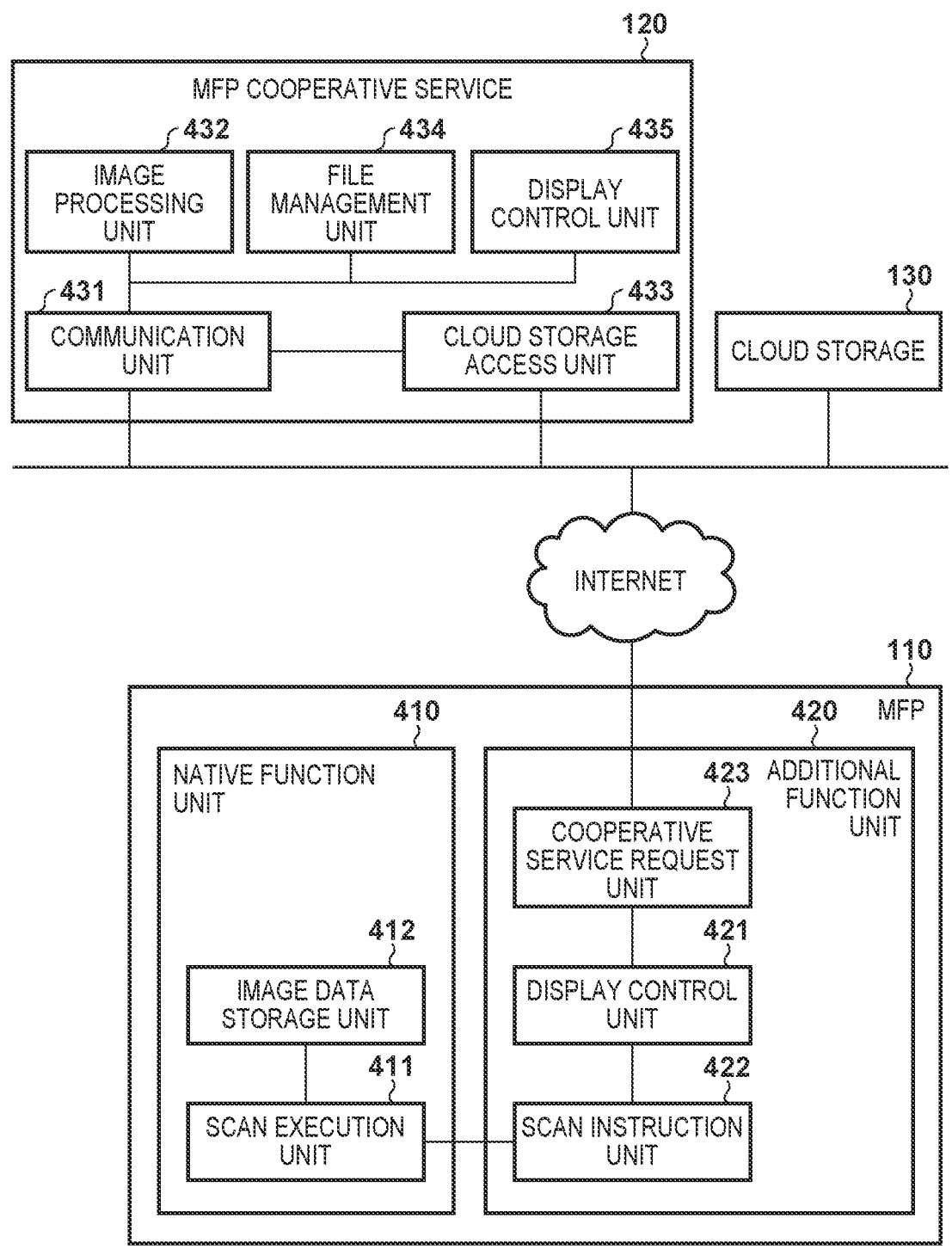
FIG. 4 is a diagram of a software configuration of the present system.

FIG. 4 is a diagram of a software configuration of the image processing system according to the present embodiment. The MFP 110 is roughly divided into two parts: a native function unit 410 and an additional function unit 420. While each unit included in the native function unit 410 is standardly provided in the MFP 110, the additional function unit 420 is an application that has been additionally installed on the MFP 110. The additional function unit 420 is a Java® based application and can easily realize addition of a function to the MFP 110. Another additional application (not illustrated) may be installed on the MFP 110.

The native function unit 410 includes a scan execution unit 411 and an image data storage unit 412. The additional function unit 420 includes a display control unit 421, a scan instruction unit 422, and a cooperative service request unit 423.

The display control unit 421 displays a UI screen for accepting an operation by the user on a liquid crystal display unit, which is of the operation unit 219 of the MFP 110 and includes a touch panel function. For example, the display control unit 421 displays UI screens, such as a screen for inputting authentication information for accessing the MFP cooperative service 120, scan settings, and a scan start operation; a preview screen; and a screen for setting a file name and a folder path to a file storage destination. The scan instruction unit 422 makes a request to the scan execution unit 411 to perform scan processing together with the scan settings that accord with a user instruction inputted via a UI screen.

The scan execution unit 411 receives the scan request including the scan settings from the scan instruction unit 422. The scan execution unit 411 generates scanned image data by reading a document, which has been placed on a document glass plate, by the scanner unit 221 via the scanner I/F 217 in accordance with the scan request. The generated scanned image data is transmitted to the image data storage unit 412. The scan execution unit 411 transmits a scanned image identifier, which uniquely indicates the stored scanned image data, to the scan instruction unit 422. The scanned image identifier is a number, symbol, alphabetical letter, and the like (not illustrated) that uniquely identifies the scanned image in the MFP 110. The image data storage unit 412 stores the scanned image data received from the scan execution unit 411 in the HDD 214.

The scan instruction unit 422 obtains from the image data storage unit 412 scanned image data corresponding to the scanned image identifier received from the scan execution unit 411. The scan instruction unit 422 makes a request to the cooperative service request unit 423 to perform an instruction for processing on the obtained scanned image data in the MFP cooperative service 120.

The cooperative service request unit 423 makes a request to the MFP cooperative service 120 for various processes. For example, the cooperative service request unit 423 makes a request for login, analysis of a scanned image, transmission of a scanned image, or the like. A protocol, such as REST or SOAP, is used for communication with the MFP cooperative service 120, but another communication means may be used.

The MFP cooperative service 120 includes a communication unit 431, an image processing unit 432, a cloud storage access unit 433, a file management unit 434, and a display control unit 435.

Upon receiving a processing request from an external apparatus, the communication unit 431 performs as appropriate an instruction for processing to the image processing unit 432, the cloud storage access unit 433, the file management unit 434, and the display control unit 435 in accordance with the request. In addition, the communication unit 431 transmits a request for confirming a file name to the client PC 111.

The image processing unit 432 performs image processing, such as character region extraction, form type classification, OCR processing, and entity region extraction, on an image. Details on these processes will be described later.

The cloud storage access unit 433 makes a request for processing to the cloud storage. A cloud service publishes various interfaces for storing a file in a cloud storage and obtaining the stored file, with a protocol, typically, REST, SOAP, or the like. The cloud storage access unit 433 operates the cloud storage using the published cloud storage interfaces.

The file management unit 434 creates a file name and assigns it to a file as well as stores and deletes files. The display control unit 435 receives a request from a web browser operating on another terminal (not illustrated), such as a PC or a mobile connected via the Internet, and returns screen configuration information (such as HTML and CSS) necessary for a screen display. The user confirms a file name as well as changes various settings via a screen displayed in the web browser.

Although FIG. 4 describes an example of a configuration in which the additional function unit 420 is installed on the MFP 110, the present invention is not limited to this configuration, and the functions of the additional function unit 420 may be included in the client PC 111.

<Overall Flow of Processing>

Figure 5:
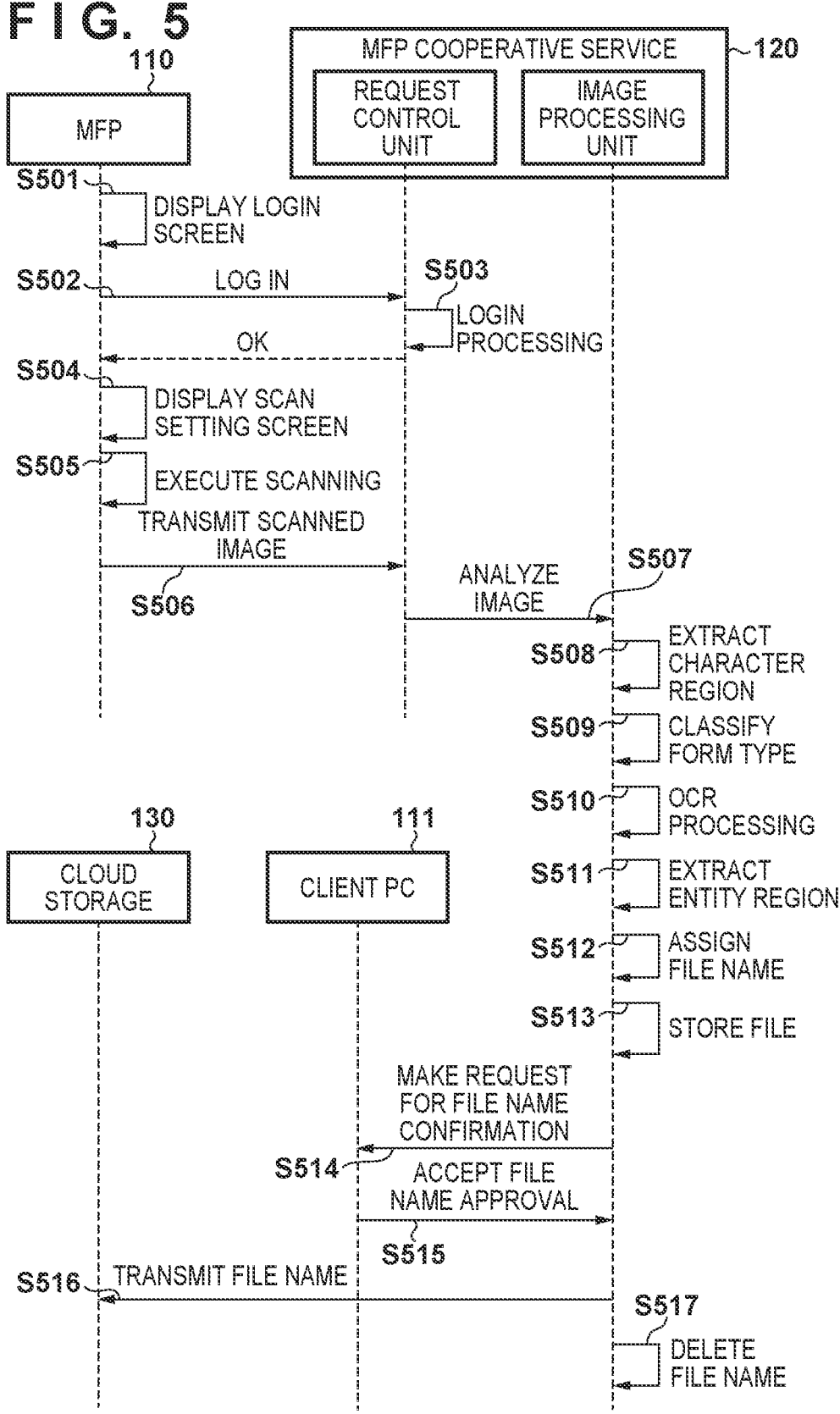
FIG. 5 is a sequence diagram for explaining a flow of processing between each device.

FIG. 5 is a sequence diagram for explaining a flow of processing between each device for when an image scanned by the MFP 110 is converted into a file and then transmitted to the cloud storage. Here, communication between each device will be mainly described.

Under normal conditions, the MFP 110 displays on the touch panel a main screen in which buttons for performing the respective provided functions are arranged.

By an additional application (hereinafter referred to as a scan application) for transmitting a scanned form to the cloud storage being installed on the MFP 110, a button for using a function of the application is displayed on the main screen of the MFP 110. When this button is pressed, a screen for transmitting a scanned form to the cloud storage is displayed, and processing indicated in the sequence of FIG. 5 is performed.

In step S501, the MFP 110 displays a login screen for inputting authentication information for accessing the MFP cooperative service 120, and in step S502, the MFP 110 attempts to log in to the MFP cooperative service 120 based on the inputted authentication information. In step S503, the MFP cooperative service 120 verifies whether the authentication information, such as a user name and a password, included in a login request, is correct and, if so, returns an access token to the MFP 110. Various requests made thereafter from the MFP 110 to the MFP cooperative service 120 thereafter are issued with this access token, and the user for whom the processing is to be performed can be identified by this information. A method of authenticating the user is performed using a generally-known method (authorization using basic authentication, digest authentication, OAuth, or the like).

When login processing is successfully completed, the MFP 110 displays a scan setting screen in step S504. In the scan setting screen, the user performs setting related to various kinds of scan reading. This setting may include a setting for "automatic storage approval". The setting for "automatic storage approval" is an option setting for storing a file with a file name without an approval of the file name by the user if it is highly probable that an image file name automatically created from a paper form is a name of that form. The level of probability will be described later. After this setting, when a user places a target of scanning, that is, a paper form to be digitized, on the document glass plate or the ADF and presses a "scan start" button, the MFP 110 performs scanning in step S505 to generate image data into which the paper form has been digitized. Then, in step S506, the MFP 110 transmits the image generated by the scanning processing to the MFP cooperative service 120. Upon receiving the image, in step S507, the MFP cooperative service 120 starts image analysis in the image processing unit 432 of the MFP cooperative service 120.

In step S508, the MFP cooperative service 120 analyzes a pattern of pixel values in the image to extract a character region in which there are characters. In step S509, the MFP cooperative service 120 classifies the form type. Specifically, the MFP cooperative service 120 compares an arrangement of the character region extracted in step S508 and an arrangement of a character region of a previously-scanned image stored for each form type to identify an image having a similar arrangement of the character region and then adopts a form type of that image as a classification result. In step S510, the MFP cooperative service 120 performs optical character recognition (OCR) processing on the extracted character region. OCR is a technique for recognizing characters in a region of interest in an image and converting the characters into text data.

When the OCR processing is executed, for each character present in the region of interest, a candidate character, which is an OCR result, and a value called a likelihood, which expresses how likely that candidate character is a correct character in a probability in a range of 0 to 1, is obtained. Here, it is assumed that, in an image pattern present in the region of interest, the higher the degree of coincidence with an image feature described for each character in a dictionary used for OCR processing, the higher the likelihood. At this time, a candidate character with the highest likelihood is adopted as an OCR result. For example, when OCR processing is performed on a region in which a character "キ (ki)" is written, "キ (ki)" and "#" are obtained as candidate characters for an OCR result, and "0.8" and "0.1" are obtained as respective likelihoods; in this case, "キ (ki)"

which has the greater likelihood is adopted as the OCR result. The OCR result and other candidate characters are stored in the HDD 314, together with their respective likelihoods.

In step S511, the MFP cooperative service 120 extracts an entity region based on the arrangement of the character region extracted in step S508, the result of determination of form type in step S509, and the like. The entity region is a region in which text (an entity) representing an attribute, such as "document name" and "issuer company name" are present. What kind of entity is to be extracted is determined in advance. In addition, a character string obtained as a result of performing the OCR processing on the entity region is defined as an entity character string. For each form type, the MFP cooperative service 120 holds in advance a positional relationship of each entity region with a surrounding character region or characteristic information related to a format of a character string in the region. Then, the MFP cooperative service 120 uses either or both of these to extract the entity region.

The positional relationship with a surrounding character region is, for example, information that an entity region corresponding to an "issuance date" is adjacent to other character regions with respect to a left portion and a bottom portion of the region. The characteristic information related to a format of a character string is, for example, information that a character string in an entity region corresponding to the "issuance date" is in a format represented by "****/*/*". When entity region extraction is executed, coordinates of a candidate region corresponding to a respective entity are extracted from the character region extracted in step S508. In addition, a value called a likelihood, which expresses how likely that candidate region is a correct region in a probability in a range of 0 to 1, is also obtained. Here, it is assumed that the likelihood of the entity region is higher the higher the degree of coincidence of the entity region with conditions related to its positional relationship with a surrounding character region, the format of a character string in the region, and the like and which are to be satisfied by a respective entity region. At this time, for each entity, a candidate region with the greatest likelihood is adopted as an entity region of the entity. For example, when entity region extraction is performed, two character regions are extracted from an image as candidate regions corresponding to an entity "document name". Here, if "0.8" and "0.1" are obtained as the respective likelihoods, a region in a first position with the greater likelihood will be adopted as a "document name" entity region. Coordinates of each entity region and their likelihood are stored in the HDD 314. At the same time, a type of the entity region is also stored in association with the entity region.

The likelihood of an entity region may be evaluated based on, for example, each of its positional relationship with a character region surrounding the entity region and the format of a character string in the entity region. That is, the likelihood of an entity region may be evaluated based on a degree of coincidence between the entity region's positional relationship with a character region surrounding the entity region and a predetermined positional relationship, and a degree of coincidence between the format of a character string in the entity region and a predetermined format. For example, a configuration may be taken so as to determine a predetermined maximum score for each of the format and the positional relationship with a surrounding character region (where a sum thereof is 1) and perform an evaluation in accordance with the degrees of coincidence.

Regarding the format, for example, if an entity includes numbers and separators, the evaluation may be based on whether a type of a symbol used as the separator, the number of digits of each of the separated numbers, and the like coincide with a predetermined symbol and number of digits. For example, if an entity consists of characters, it may be evaluated whether, for example, for word that coincides with a predetermined reserved word is included. Regarding the positional relationship with a surrounding character region, for example, if an entity is a date entity, it may be evaluated whether the entity is to the upper right of all other character regions, and if an entity is a document name entity it may be given the highest evaluation if it is near the center in a left-right direction, and given a second-highest evaluation if it is in an upper left corner. For example, a configuration may be taken so as to accumulate a predetermined score for each instance of coincidence with such evaluation items and use the results as the likelihood. This is only one example of course, and another evaluation method may be used.

In step S512, the MFP cooperative service 120 combines the entity character strings extracted in step S510 and step S511 to create a file name and assigns it to the file. At this time, the file name is created in accordance with a file name creation rule that has been set in advance by the user for each form type. The file name creation rule defines how to combine entity character strings extracted from the image with a fixed character string specified by the user to create a file name. For example, a rule such as "file name: '{document name}-{issuer company name}-{issuance date}.pdf" is set. Here, it is assumed that entity character strings corresponding to respective entities are substituted in for the {document name}, {issuer company name}, and {issuance date} portions. In addition, it is assumed that a fixed character string is input directly for the ".pdf" portion. For example, consider cases in which "invoice", "AAA Co., Ltd.", and "2021/6/3" have been extracted as entity character strings corresponding to the entities {document name}, {issuer company name}, and {issuance date}. In this case, a file name is created as "invoice -AAA Co., Ltd. -2021/6/3.pdf" in accordance with the above rule.

In step S513, the MFP cooperative service 120 stores the file to which the file name has been assigned in step S512 in the HDD 314. At this time, a storage period is set for each file, and a file that the user has not approved within that period is deleted, as will be described later. This makes it possible to prevent the memory capacity of the HDD 314 from being depleted.

Figure 6:
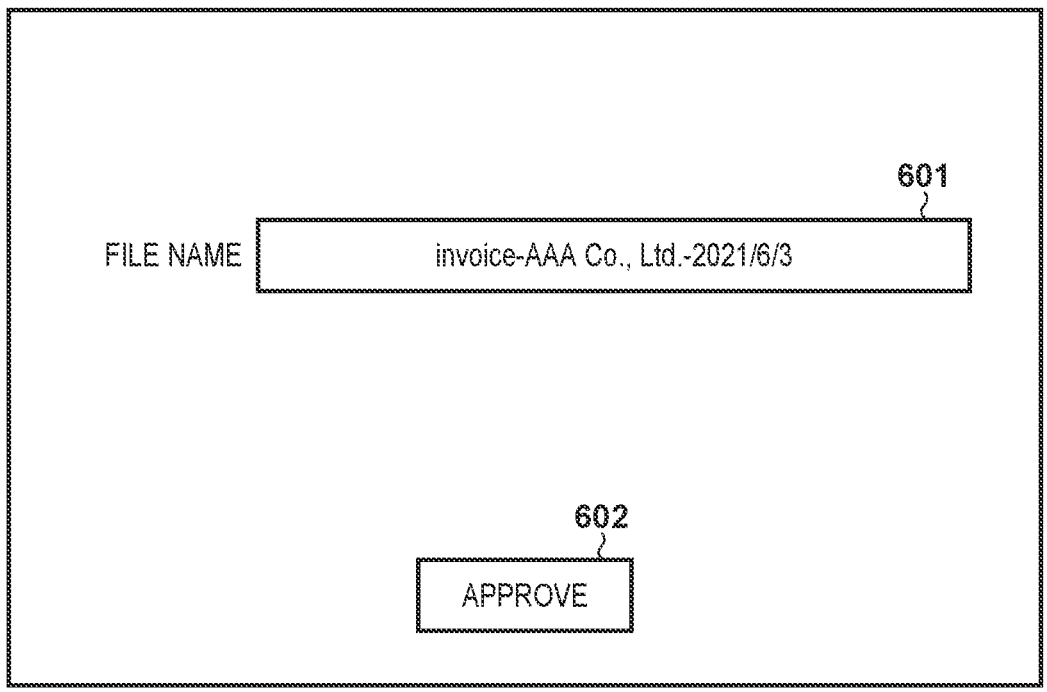
FIG. 6 is a diagram illustrating a screen for confirming of a file name.

In step S514, the MFP cooperative service 120 transmits a request for file name confirmation to the client PC 111. Specifically, the MFP cooperative service 120 transmits an email in which a Universal Resource Locator (URL) for confirming the file name is included to an email address of the logged-in user of the MFP 110. The URL for confirming the file name indicates, for example, a storage destination of the file stored in step S513. Alternatively, the URL for confirming the file name may indicate a storage destination at which text of that file name has been stored. The user can refer to the file name stored in step S513 on a web page, which is a destination of the URL-for-confirmation link, as shown in FIG. 6, and approve the file name after modifying that character string as needed. At this time, a file name 601 is displayed in a user interface of FIG. 6, and that file name can be approved by pressing a confirmation button 602. Although FIG. 6 illustrates an example in which only one file name is included, a plurality of file names for which a confirmation request has been made may be displayed in a list.

In step S515, the MFP cooperative service 120 accepts approval for the file name from the user. At this time, the approved file name and the entity character strings constituting the file name are stored in the HDD 314. In step S516, the MFP cooperative service 120 transmits the file for which the file name has been approved to the cloud storage 130 with the approved file name. In step S517, the MFP cooperative service 120 deletes the file transmitted in step S516 from the HDD 314.

Figure 7:
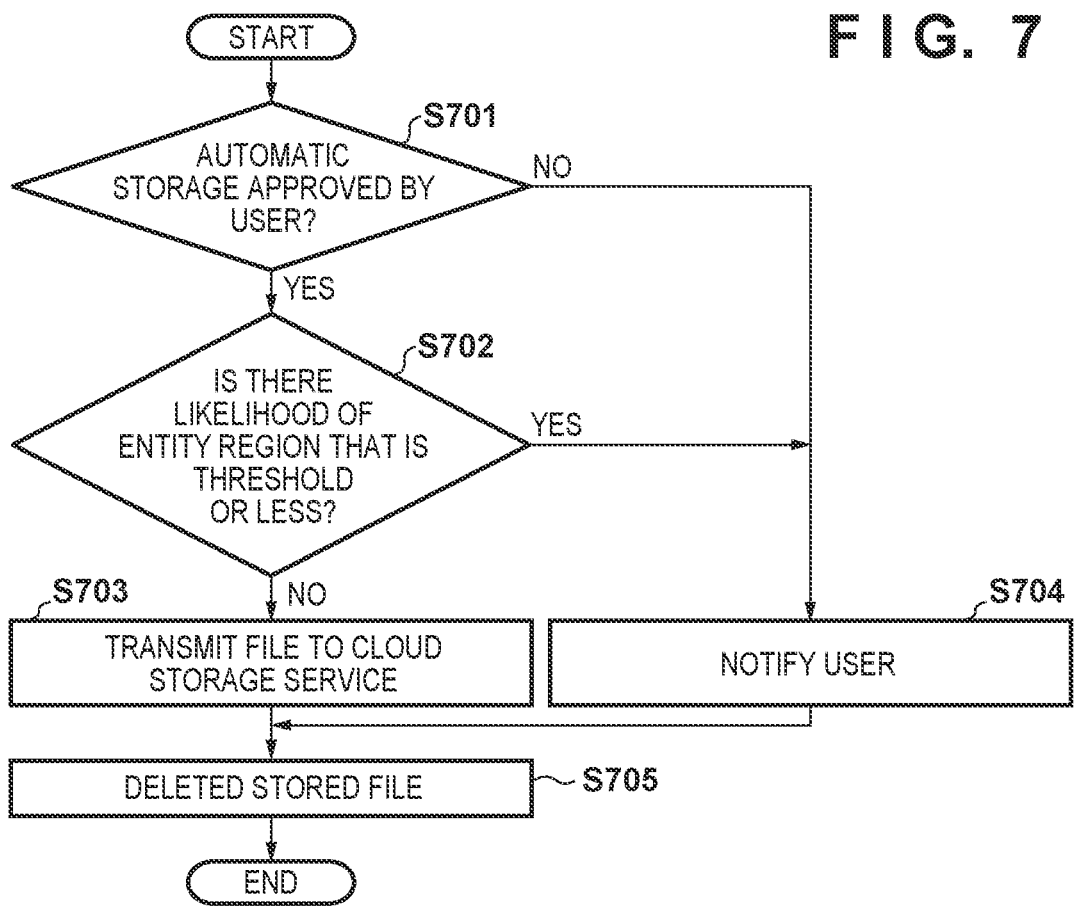
FIG. 7 is a flowchart for explaining details of processing to be performed by an image processing unit for when a file name is not approved by a user within a storage period of a file in the present system.

FIG. 7 is a flowchart for explaining a flow of processing to be executed by the MFP cooperative service 120 when a file name has not been approved by the user before a storage period of a respective file stored in the HDD 314. Regarding the processing according to the flowchart, program code stored in the HDD 314 is loaded into the RAM 313 and then executed by the CPU 311.

It may be determined that a storage period of a file has expired, which triggers execution of the procedure of FIG. 7, as follows. For example, a creation date and time of the file that has been stored in step S513 and remains as is referenced at predetermined time intervals, that is, periodically. A period of time that has elapsed from the creation date and time to the current date and time is identified, and if it exceeds a period, which is the storage period, the file is set to be a target of the procedure of FIG. 7. Alternatively, a configuration may be taken so as to store the storage period as part of a file's attributes at the time of storing the file in step S513, search for a file that has been stored for more than the storage period at predetermined time intervals, and if there is such file, set that file as a target of the procedure of FIG. 7. If a plurality of files have been created and stored at the same time in step S513, the storage periods of these plurality of files may be managed together. Of course, a method other than these methods may be used so long as a file that has exceeded the storage period can be identified. The processing of FIG. 7 is performed with the above-mentioned file that has exceeded the storage period as a target file. If there are a plurality of target files, the processing of FIG. 7 may be executed for each target file.

Figure 8:
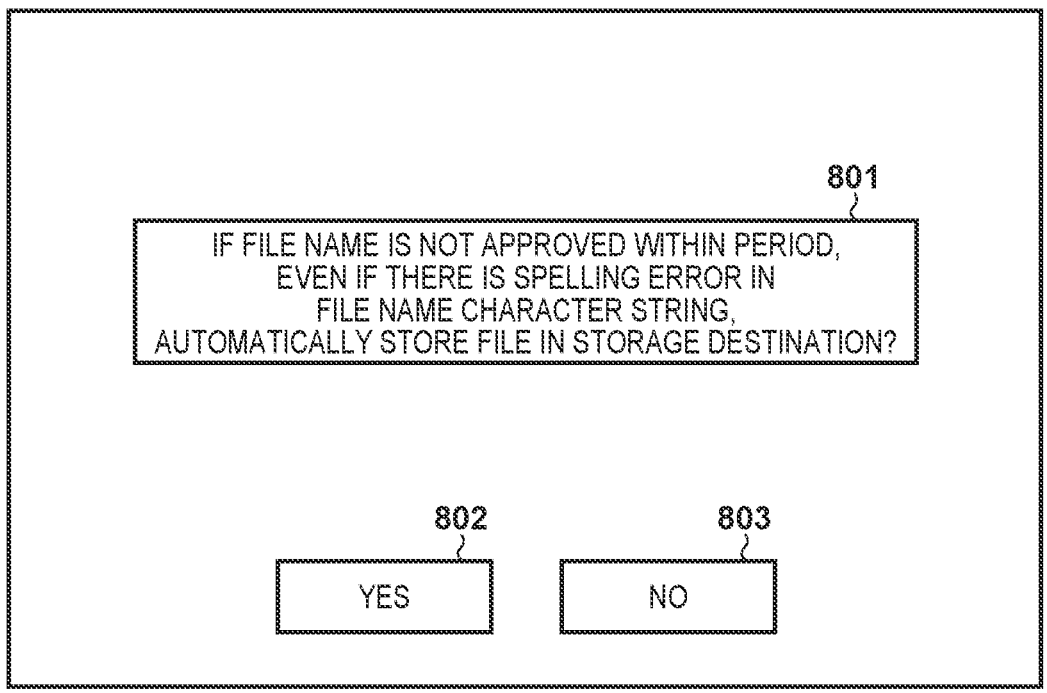
FIG. 8 is a diagram illustrating a confirmation screen related to whether a file can be automatically stored.

In step S701, when the file name is not approved within the storage period, the image processing unit 432 determines whether "automatic storage approval" is set. That is, the image processing unit 432 determines whether the user has approved in advance that the file may be automatically stored in the cloud storage 130. The "automatic storage approval" is as already explained in step S504 of FIG. 5. At the time of setting, specifically, the approval from the user is accepted in advance on a UI screen, such as in FIG. 8, which is to be displayed on the operation unit 219 of the MFP 110. Here, it is assumed that a message 801 is a message for querying whether to approve automatic storage and the user can select whether to approve automatic storage by pressing an approve button 802 or a reject button 803 in response thereto. The selection result is stored as part of the settings and is referenced in step S701. The message 801 may be appropriately set; however, in this example, the message is to the effect of permitting a spelling error, assuming that if the error is a spelling error, the name automatically generated for a certain form is unlikely to be erroneously recognized for a name of another form. As a result of referencing the settings in step S701, if automatic storage is approved, the processing proceeds to step S702, and if not, the processing proceeds to step S704.

In step S702, the image processing unit 432 refers to the likelihood of each entity region of the document image data of the target file stored in the HDD 314 in step S511 and determines whether there is a likelihood that is a threshold or less. It is assumed that at this time, a threshold, which has been determined as the likelihood indicating that an extraction result is highly likely to be correct based on an entity region extraction result collected in advance and a likelihood of an extracted region, is used as the threshold. If there is no likelihood that is the threshold or less, the processing proceeds to step S703; if there is a likelihood that is the threshold or less, the processing proceeds to step S704. If a document image of a target file contains a plurality of entity regions, it is determined that there is a likelihood that is the threshold or less if there is at least one entity region with a likelihood that is the threshold or less. The likelihood of an entity region is referenced as an index indicating a level of probability that a name automatically generated for a target form is a unique name of that form. It is thought that the higher the likelihood, the less likely a recognition error will occur, and the lower the likelihood, the more likely a recognition error will occur. For example, assuming that three regions are extracted as entity regions, a case where the likelihoods of respective regions are "0.95", "0.92", and "0.78" and "0.8" is adopted as a threshold is considered. In this case, "0.95" and "0.92" are greater than the threshold "0.8", but "0.78" is less than the threshold "0.8". Therefore, it is determined that there is a likelihood that is the threshold or less, and the processing proceeds to step S704.

In step S703, the image processing unit 432 transmits the target file stored in the HDD 314 to the cloud storage 130. Meanwhile, in step S704, the image processing unit 432 notifies the client PC 111 that the target file will not be transmitted to the cloud storage 130. The notification method includes email and the like; however, it is assumed that the method does not matter so long as a notification can be transmitted to the user. At that time, the file may be backed up prior to deletion in step S705, for example, by attaching the file to an email or by storing the file on a server different from the cloud storage 130. In step S705, the image processing unit 432 deletes from the HDD 314 the file for which the storage period has expired.

Figure 9B:
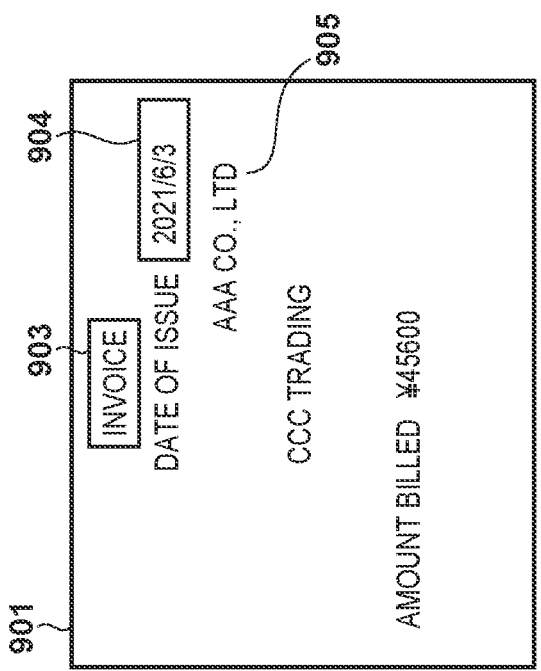
FIG. 9A and FIG. 9B are diagrams illustrating examples of a case where a wrong file name is created.
Figure 9A:
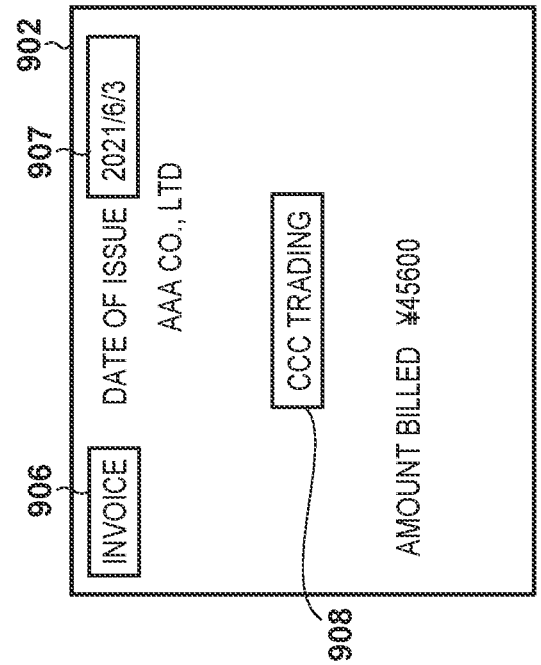

In the processing of the flowchart indicated in FIG. 7, the likelihood of an OCR result is not used and only the likelihood of an entity region is used to determine whether the file is to be transmitted to the cloud storage 130 without approval by the user. A reason therefor is described below. There are two cases, as illustrated in FIG. 9A and FIG. 9B, where an incorrect file name is created when a file name is created by combining character strings in the image. These are a case where an OCR result of a character string is incorrect (FIG. 9A) and a case where an extracted entity region is incorrect (FIG. 9B).

In the case where an OCR result of a character string is incorrect, entity regions 903 to 905 have been successfully extracted from an image 901. However, when OCR processing is performed on those regions, an OCR result for the entity region 905 is incorrect such that instead of "AAA", the result is "AAB". In the case where an extracted entity region is incorrect, entity regions 906 to 908 have been extracted from an image 902; however, the entity region 908 is a region that is not a correct entity region. When the two are compared, in the case where an OCR result of a character string is incorrect, the user can easily recognize the error simply by looking at the incorrectly-created file name. However, in the case where an extracted entity region is incorrect, the user cannot easily notice the error simply by looking at the incorrectly-created file name. That is, if the incorrectly-created name is a name that is not suitable as a file name due to a character recognition error, it is easy to notice the error simply by referencing the file name. Meanwhile, if a created name is appropriate as a file name despite it being an incorrect name for a target form due to an error in the way that the name is assigned, the user cannot easily notice the error simply by referencing the file name. Therefore, in order to determine whether a possibility that the user will be unable to notice an error in a file name simply by reading the character string is high or low, in principle, attention need only be paid to the entity region.

As described above, by implementing the present embodiment, regarding files for which approval of the file name by the user has not been completed within the storage period, it is possible to reduce the number of files for which the user has to manually reassign the file name and store in a storage. In particular, regarding a file for which there is a high probability that a file name corresponding to the contents of the form has been assigned, this is realized by deleting the file after storing the file with the automatically-assigned file name even if the storage period is exceeded without approval. This makes it possible to reduce the burden on the user. Further, it is possible to improve productivity of form digitization work.

[Variation]

A configuration may be taken so as to omit step S701 of FIG. 7. In that case, if there is no entity region which is included in a target image file and for which a likelihood is the threshold or less, an image file may be transmitted to and stored in a cloud storage without prior approval by the user. By this, even if the user does not grant prior approval, so long as a there is a high possibility that a file name is not something that would cause contents of the file to be erroneously recognized, it is possible to store a file of that file name without user approval. This makes it possible to reduce the burden on the user as well as prevent a region for storing files from being overstrained.

Second Embodiment

In the first embodiment, attention is paid only to a likelihood of an entity region, and it is determined whether the possibility that the user would be unable to notice an error in a file name simply by reading the character string is high or low. When extracting an entity region corresponding to the "issuer company name", for example, if no company name other than the "issuer company name" is in the document, the possibility that an incorrect company name will be assigned as the file name will be low; however this has not been considered.

Therefore, in a second embodiment, such information is considered, and a possibility that a file name in which the user is unable to notice an error simply by reading the character string will be created is determined.

Figure 10:
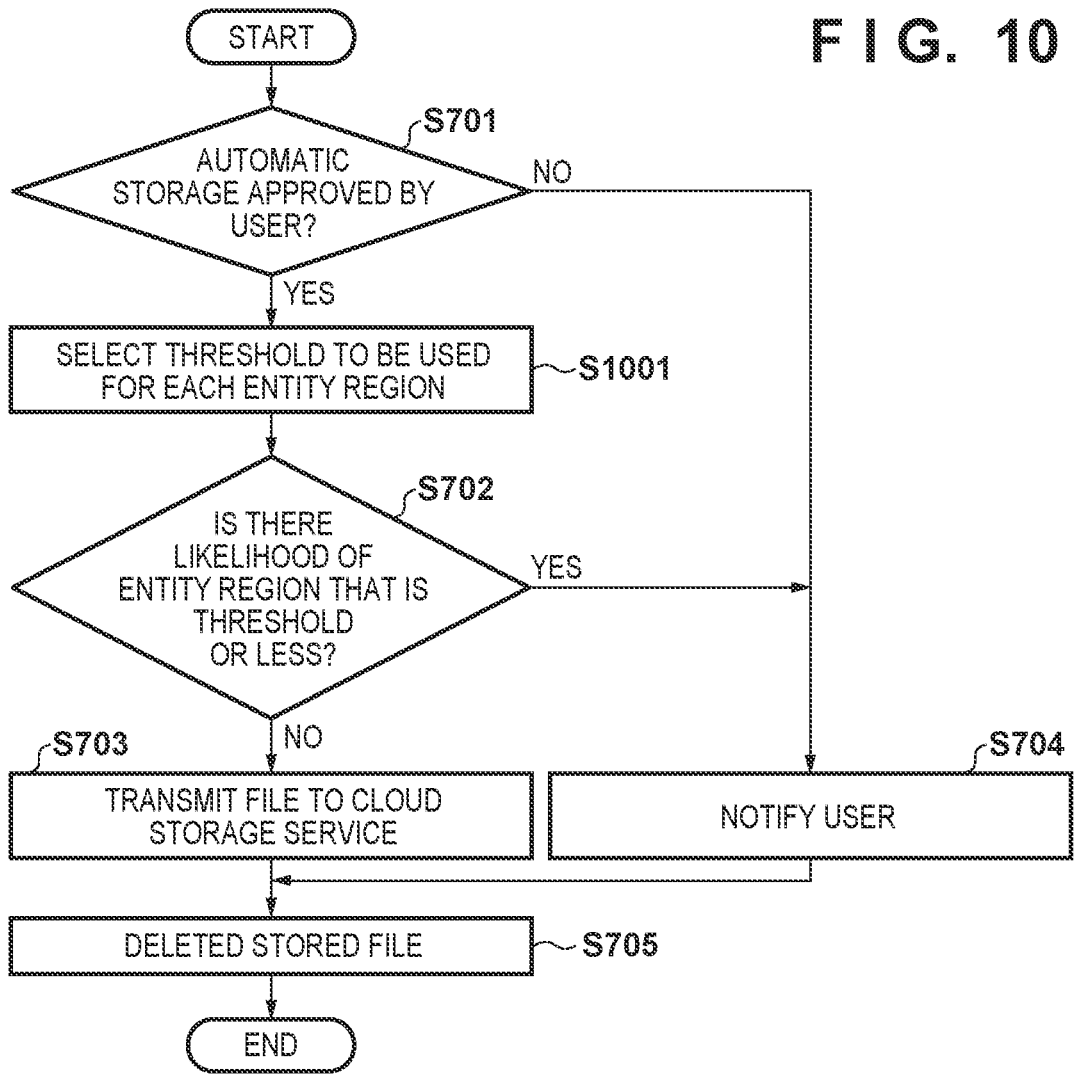
FIG. 10 is a flowchart for when a file name is not approved in a second embodiment.

Here, a flow of processing of the MFP cooperative service 120 for when a file name is not approved by the user within the storage period in the second embodiment will be described with reference to FIG. 10. Regarding the processing according to the flowchart, program code stored in the HDD 314 is loaded into the RAM 313 and then executed by the CPU 311. A description will be given for the present embodiment, focusing on differences from the first embodiment, particularly FIG. 7. Parts not particularly specified are of the same configuration and processing as in the first embodiment.

Figure 11:
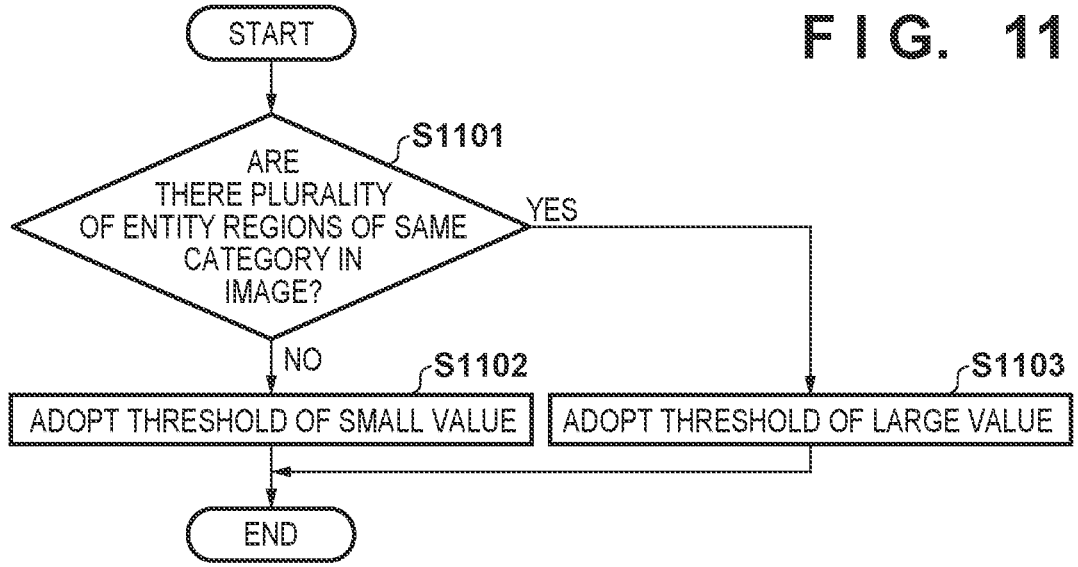
FIG. 11 is a flowchart of processing for selecting a threshold in the second embodiment.

If it is determined in step S701 that "automatic storage approval" is set, in step S1001, the image processing unit 432 selects a threshold to be used for each entity region. Next, detailed processing of step S1001 will be described with reference to FIG. 11. Regarding the processing according to the flowchart, program code stored in the HDD 314 is loaded into the RAM 313 and then executed by the CPU 311. The processing from step S1101 to step S1103, which will be described below, is assumed to be performed for each entity region stored in the HDD 314 in step S511.

In step S1101, the image processing unit 432 determines whether there are a plurality of entity regions of the same category in the image for a target entity region. A category is a superordinate concept of a respective entity, and it is assumed that a table indicating correspondence between an entity and a category as indicated in Table A is stored in the HDD 314.

TABLE A

| Entity | Category |
|---|---|
| Issuer Company Name | Company Name |
| Issuance Date | Date |
| Payment Deadline | Date |

Referring to Table A, it is determined for each entity whether there are a plurality of entities that belong to the same category as that entity in a target form. If there is no plurality of entity regions of the same category in an image, the processing proceeds to step S1102, if there are a plurality of entity regions, the processing proceeds to step S1103. In step S1102, the image processing unit 432 adopts a threshold of a small value as the threshold to be used in the subsequent step S702. In step S1103, the image processing unit 432 adopts a threshold of a large value as the threshold to be used in the subsequent step S702. It is assumed that at this time, a threshold, such as "0.6" or "0.8", which has been determined as the likelihood indicating that an extraction result is highly likely to be correct based on an entity region extraction result collected in advance and a likelihood of an extracted region, is used as the threshold. For example, regarding an entity region corresponding to an "issuer company name", if there is no entity region for which the category is "company name" in the document, a threshold of a small value of "0.6" is adopted. Also, for example, regarding a entity region corresponding to an "issuance date", if there is an entity region "payment deadline" for which the category is "date" in the document, a threshold of a large value of "0.8" is adopted. Here, the magnitude of the threshold is determined relatively. That is, when there is no plurality of entity regions of the same category in the image, a threshold that is smaller than that for when there are a plurality of entity regions is adopted. The significance of reducing the value of the threshold is that a possibility of error is more permissible. This is because if there is only one entity region of the same category, a file name generation error that is due to confusion of entity regions is unlikely.

The method described in the present embodiment considers whether there are a plurality of entity regions of the same category, thereby allowing a determination as to whether a possibility the user will be unable to notice an error in a file name simply by reading the character string is high or low.

Third Embodiment

In the first embodiment, there may be a case where even if a correct entity region is extracted for an entity consisting of numbers, such as a date or an amount, if an OCR result is incorrect, a file name in which the user is unable to notice an error simply by reading the character string is created.

For example, a case in which even if an entity region corresponding to the "issuance date" is correctly extracted, "4/23" is erroneously recognized as "4/28" as a result of performing OCR processing on a character string in the region is such a case.

In a third embodiment, when an OCR result of a character in an entity region is a number, a possibility that a file name in which the user is unable to notice an error simply by reading the character string will be created is determined also in consideration of the OCR result.

Figure 12:
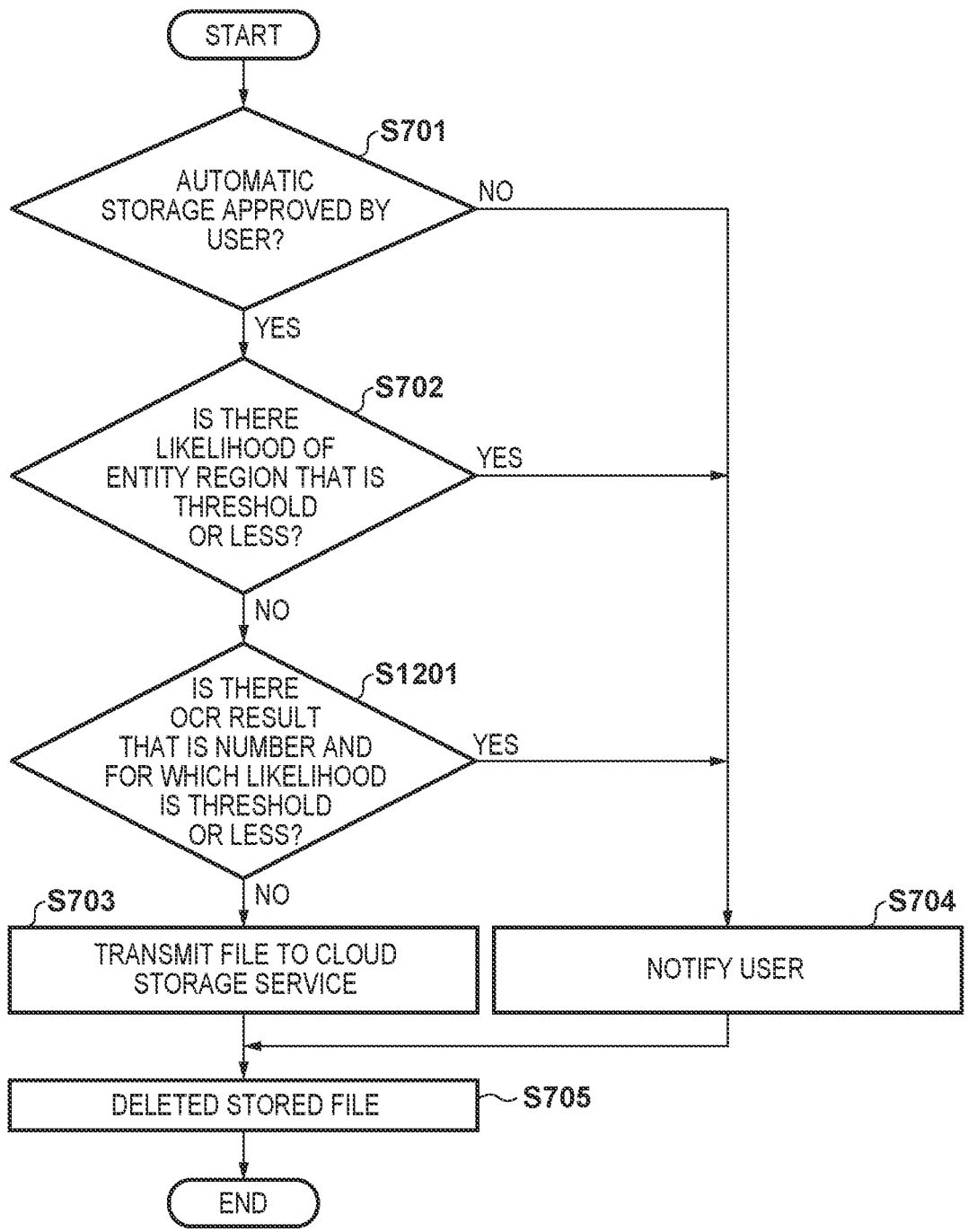
FIG. 12 is a flowchart for when a file name is not approved in a third embodiment.

Here, a flow of processing of the MFP cooperative service 120 for when a file name is not approved by the user within the storage period in the third embodiment will be described with reference to FIG. 12. This processing is performed in the present embodiment in place of FIG. 7 of the first embodiment. Regarding the processing according to the flowchart, program code stored in the HDD 314 is loaded into the RAM 313 and then executed by the CPU 311. A description will be given for the present embodiment, focusing on differences from the first embodiment, particularly FIG. 7. Parts not particularly specified are of the same configuration and processing as in the first embodiment.

If it is determined in step S702 that there is no entity region for which the likelihood is the threshold or less, the processing branches to step S1201. In step S1201, the image processing unit 432 refers to an OCR result stored in the HDD 314 in step S510 and a likelihood thereof and determines whether there is any OCR result that is a number and for which the likelihood of the result is the threshold or less. It is assumed that at this time, a threshold, which has been determined as the likelihood indicating that an OCR result is highly likely to be correct based on an OCR result collected in advance and a likelihood thereof, is used as the threshold. If there is no OCR result that is a number and for which the likelihood of the result is the threshold or less, the processing proceeds to step S703; if there is an OCR result that is a number and for which the likelihood of the result is the threshold or less, the processing proceeds to step S704. For example, consider a case where there is an entity character string "4/23" in an OCR result for an extracted entity region. Consider a case where the likelihoods for "4", "/", "2", and "3" that constitute the character string are 0.95, 0.92, 0.88, and 0.78, respectively, and 0.8 is adopted as the threshold. In this case, the likelihoods 0.95, 0.92, and 0.88 for the respective characters "4", "/", and "2", are greater than the threshold 0.8; however, the likelihood 0.78 for the character "3" is less than the threshold 0.8, and the OCR result "3" is a number. Therefore, it is determined that the OCR result is a number and the likelihood of the result is the threshold or less, and the processing proceeds to step S704. In step S704, the user is notified that there is a file that has exceeded the storage period without the file name being approved. Meanwhile, in step S703, a file that has exceeded the storage period without the file name being approved is stored in the cloud storage, and that file is deleted from the HDD 314.

According to the method described in the present embodiment, it is possible, when an OCR result of a character in an entity region is a number, to determine a possibility that a file name in which the user is unable to notice an error simply by reading the character string will be created also in consideration of the OCR result. If the possibility is high, the user is notified that the file name has not been approved; however, if the possibility is low, the temporarily-stored file can be deleted after storing the file with the unapproved file name. Therefore, it is possible to effectively user resources as well as improve user convenience.

[Variation]

The second embodiment may be combined with the third embodiment. In that case, step S1001 of the second embodiment need only be performed between step S701 and step S702 of FIG. 12.

Fourth Embodiment

In the first embodiment, if there are a plurality of similar company names, even if a correct entity region is extracted, if an OCR result is incorrect, a file name in which the user is unable to notice an error simply by reading the character string may be created. Consider a case where, hypothetically, there are company names "ABC" and "ABD". Even if an entity region corresponding to the "issuer company name" is correctly extracted, "ABC" may be erroneously recognized as "ABD" in OCR processing on a character string in the region.

Therefore, in a fourth embodiment, a possibility that a file name in which the user is unable to notice an error simply by reading the character string will be created is determined. For this determination, it is also considered whether OCR result candidates include a plurality of entity character strings included in file names previously approved by the user.

Figure 13:
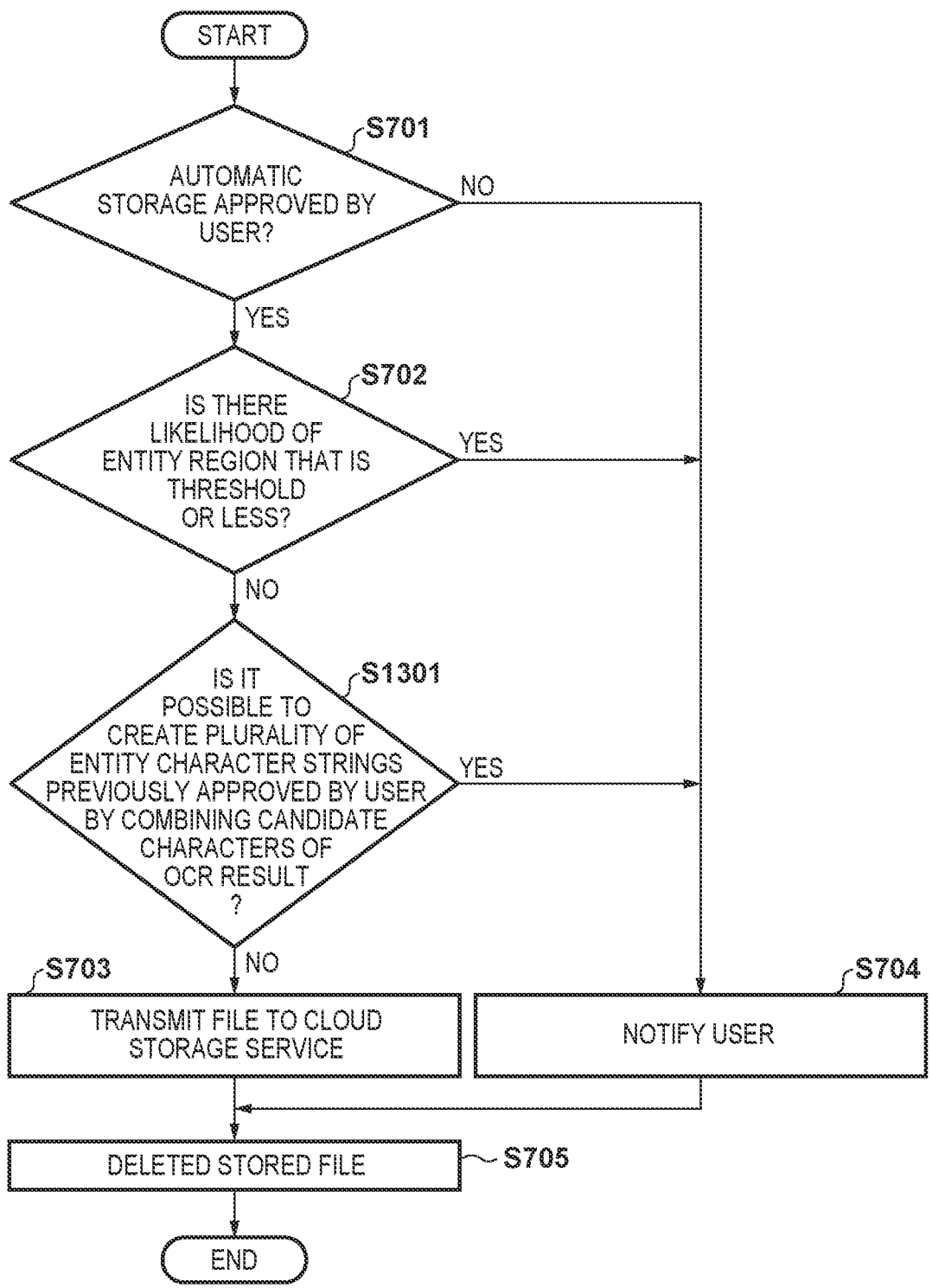
FIG. 13 is a flowchart for when a file name is not approved in a fourth embodiment.

Here, a flow of processing of the MFP cooperative service 120 for when a file name is not approved by the user within the storage period in the fourth embodiment will be described with reference to FIG. 13. This processing is performed in the present embodiment in place of FIG. 7 of the first embodiment. Regarding the processing according to the flowchart, program code stored in the HDD 314 is loaded into the RAM 313 and then executed by the CPU 311. A description will be given for the present embodiment, focusing on differences from the first embodiment. Parts not particularly specified are of the same configuration and processing as in the first embodiment.

If it is determined in step S702 that there is no entity region for which the likelihood is the threshold or less, the processing branches to step S1301. In step S1301, the image processing unit 432 first refers to an OCR result stored in the HDD 314 in step S510 and other candidate characters for a character in a respective entity region stored in the HDD 314 in step S511. These candidate characters are stored at the time of character recognition. Then, it is determined whether by combining them, it is possible to create a plurality of entity character strings included in the file names previously approved by the user. The entity character strings included in the file names previously approved by the user are also stored at the time of approval in response to approval by the user. For example, assume that for each character in an entity region containing "ABC", a first character "A", a second character "B", and third characters "C" and "D" are an OCR result and other candidate characters. In that case, when these characters are combined, it is possible to create character strings "ABC" and "ABD". If there are entity character strings that match these two character strings is included in file names previously approved by the user, it is determined that a plurality of entity character strings are included in file names previously approved by the user can be created. If a plurality of entity strings cannot be created, the processing proceeds to step S703; if a plurality of entity strings can be created, the processing proceeds to step S704. In step S705, the stored image data file is deleted; however, the candidate characters of the characters included in the entity character string and the entity character string used in the file name are left without being deleted.

According to the method described in the present embodiment, if there are a plurality of similar entity character strings, such as company names, that is also considered, thereby allowing to determine a possibility that a file name in which the user is unable to notice an error simply by reading the character string will be created.

[Variation]

The second embodiment may be combined with the fourth embodiment. In that case, step S1001 of the second embodiment need only be performed between step S701 and step S702 of FIG. 13. The third embodiment may be combined with the fourth embodiment. In that case, step S1201 of FIG. 12 need only be performed when it is determined Yes in step S1301 of FIG. 13. In this way, advantageous effects of the third embodiment and the fourth embodiment can be enjoyed together. Of course, the second embodiment may be further applied.

Fifth Embodiment

In the first embodiment, when it is determined that the possibility that a file name in which the user is unable to notice an error simply by reading the character string will be created is low, a file is assigned the created file name as is and stored in the storage destination. In this case, there is also a possibility that an OCR result of an entity character string included in the file name will be incorrect. Therefore, in a fifth embodiment, if an entity character string included in a created file name is similar to an entity character string included in a file name previously approved by the user, the file name is corrected by replacing the entity character string. Then, after the correction, the file is transmitted to the cloud storage 130.

Figure 14:
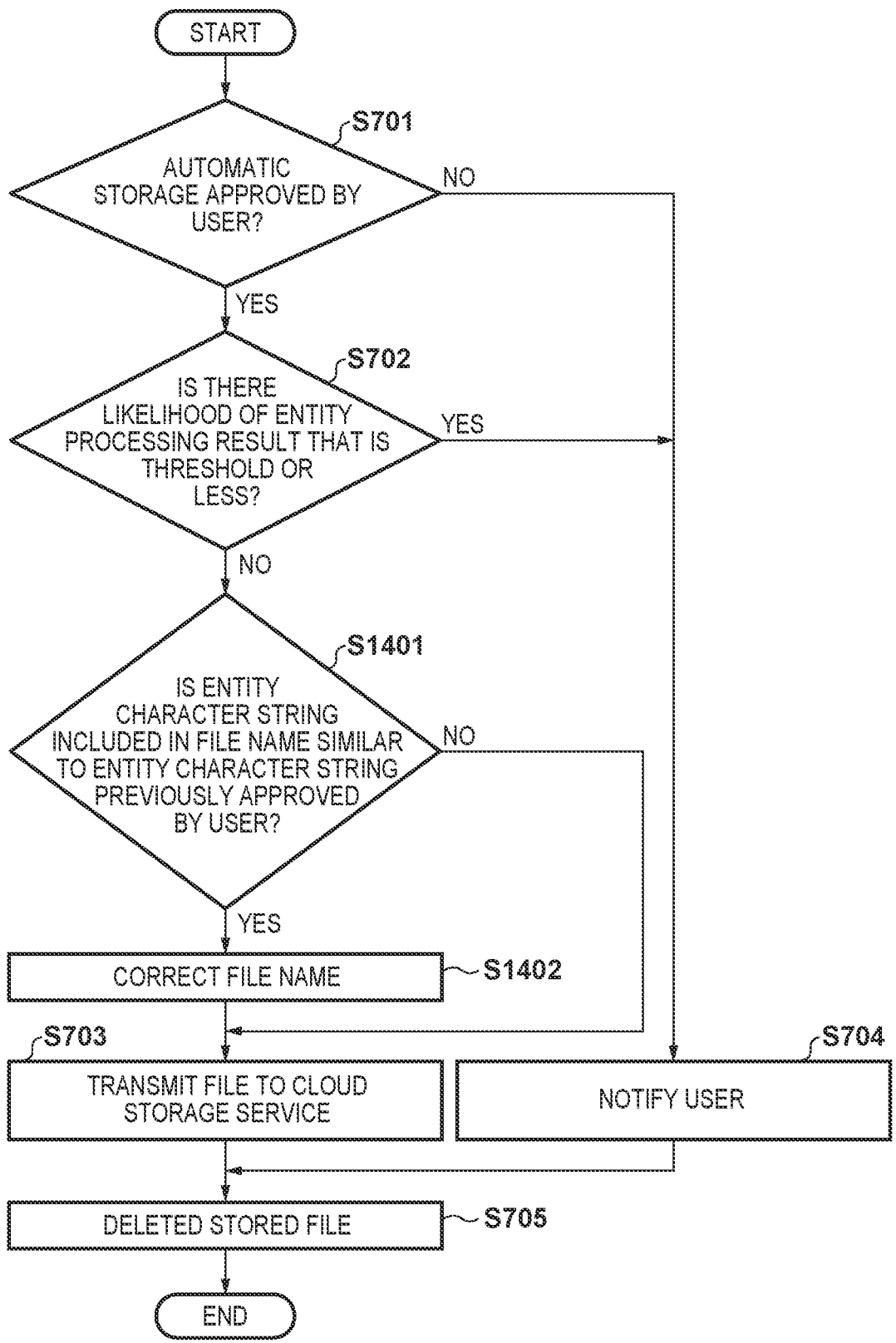
FIG. 14 is a flowchart for when a file name is not approved in a fifth embodiment.

Here, a flow of processing of the MFP cooperative service 120 for when a file name is not approved by the user within the storage period in the fifth embodiment will be described with reference to FIG. 14. This processing is performed in the present embodiment in place of FIG. 7 of the first embodiment. Regarding the processing according to the flowchart, program code stored in the HDD 314 is loaded into the RAM 313 and then executed by the CPU 311. A description will be given for the present embodiment, focusing on differences from the first embodiment. Parts not particularly specified are of the same configuration and processing as in the first embodiment.

If it is determined in step S702 that there is no entity region for which the likelihood is the threshold or less, the processing branches to step S1401. In step S1401, the image processing unit 432 determines whether each entity character string included in the file name created in step S512 is similar to an entity character string included in a file name previously approved by the user. It is assumed that at this time, the determination as to whether two character strings are similar is in accordance with whether an index indicating a degree of similarity between character strings, such as the Levenshtein distance, is a threshold or less. Here, it is assumed that a value of the Levenshtein distance for which it can be determined that character strings are similar is defined in advance and that value is used as the threshold. If the character strings are similar, the processing proceeds to step S1402; if not, the processing proceeds to step S703.

In step S1402, the image processing unit 432 corrects the file name by replacing the entity character string included in the file name to a similar entity character string included in a file name previously approved by the user. For example, consider a case where a file name contains an entity character string "AAB Co., Ltd.". At this time, if the user had previously approved a file name including an entity character string "AAA Co. Ltd.", the file name is corrected by replacing a portion "AAB Co., Ltd." of the file name with "AAA Co., Ltd.". The entity character strings included in the file names previously approved by the user need only be stored at each instance of approval by the user.

According to the method described in the present embodiment, it is possible, if an entity character string included in a created file name is similar to an entity character string included in a file name previously approved by the user, to correct the file name by replacing the entity character string.

[Variation]

The fifth embodiment may be applied to other embodiments or a combination thereof. In that case, regarding any of the second to fourth embodiments or combinations thereof, a file name need only be corrected by executing step S1401 and step S1402 immediately prior to branching to step S703.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-032808, filed Mar. 3, 2022 which is hereby incorporated by reference herein in its entirety.

What is claimed is:

1. An information processing apparatus comprising:
one or more memories configured to store one or more programs; and
one or more processors, wherein the one or more processors are caused by the one or more programs to:

generate a name using characters recognized in image data, assign the name to the image data, and store the image data;

make a request for approval by a user regarding the name, transmit the image data to an external apparatus after the image data is approved by the user, and delete the image data;

in a case where a period of storing the image data has exceeded a predetermined period without the name being approved by the user, and a first likelihood that an area corresponding to the recognized characters to be used for generating the name is a correct area as an area to be used for generation of the name exceeds a predetermined value regardless of a second likelihood that the recognized characters to be used for generating the name are recognized correctly, transmit, without the approval by the user, the image data to the external apparatus before deleting the image data; and in a case where the period of storing the image data has exceeded the predetermined period without the name being approved by the user, and the first likelihood that the area corresponding to the recognized characters to be used for generating the name is a correct area as an area to be used for generation of the name does not exceed the predetermined value regardless of the second likelihood that the recognized characters to be used for generating the name are recognized correctly, send an email to which the image data is attached to the user and delete the image data that has exceeded the predetermined period without transmitting the image data to the external apparatus.

2. The information processing apparatus according to claim 1, wherein
there are a plurality of areas corresponding to the recognized characters to be used for generating the name, and each of the plurality of areas has a respective first likelihood that a respective area is a correct area to be used for generation of the name, and wherein the image data is transmitted to the external apparatus in a case where the period of storing the image data has exceeded the predetermined period without the name being approved by the user and all of the respective first likelihoods exceed the predetermined value.

3. The information processing apparatus according to claim 1, wherein
in the assignment, an entity region including a character string that satisfies a predetermined condition based on the characters recognized in the image data is identified and a name using characters of the entity region is created, and
the predetermined condition includes that likelihoods of all the entity regions identified in the image data exceeds a first threshold, that a character included in the character string used for identifying the entity region is a number, and that likelihoods of all recognized characters exceed a second threshold.

4. The information processing apparatus according to claim 1, wherein
in the assignment, an entity region including a character string that satisfies a predetermined condition based on the character recognized in the image data is identified and a name using a character of the entity region is created, and
the predetermined condition includes that likelihoods of all entity regions identified in the image data exceed a first threshold and that it is not possible to create a plurality of character strings of an entity region used for the name approved by the user by combining candidate characters at the time of character recognition of a character included in the character string used for identifying the entity region.

5. The information processing apparatus according to claim 1, wherein
the first likelihood is evaluated based on a degree of coincidence between a positional relationship with a character area surrounding the area corresponding to the recognized characters to be used for generating the name and a predetermined positional relationship and a degree of coincidence between a format of a character string in the area corresponding to the recognized characters to be used for generating the name and a predetermined format.

6. The information processing apparatus according to claim 2, wherein
the one or more programs cause the one or more processors to:
in a case where an index indicating a similarity between the character string of the entity region used for creating the name and a character string of an entity region used for creating a name previously approved by the user exceeds a third threshold, the character string of the entity region used for creating the name is replaced with the character string of the entity region used for creating the name previously approved by the user.

7. The information processing apparatus according to claim 1, wherein
the predetermined value varies depending on the number of areas belonging to a category that are included in the image data.

8. The information processing apparatus according to claim 7, wherein
in a case where a plurality of areas of a same category are included in the image data, the predetermined value for the plurality of areas is greater than the predetermined value for an area for a case where no other area in the image data is of the same category.

9. The information processing apparatus according to claim 1, wherein
one or more programs further cause the one or more processors to:
set that the user has approved that the image data be transmitted to the external apparatus without the name being approved by the user.

10. A non-transitory computer-readable storage medium storing thereon a program which, when loaded into a computer and executed, causes the computer to execute a process, the process comprising:
generating a name using characters recognized in image data, assigning the name to the image data, and storing the image data;
making a request for approval by a user regarding the name, transmitting the image data to an external apparatus after the image data is approved by the user, and deleting the image data;
in a case where a period of storing the image data has exceeded a predetermined period without the name being approved by the user, and a first likelihood that an area corresponding to the recognized characters to be used for generating the name is a correct area as an area to be used for generation of the name exceeds a predetermined value regardless of a second likelihood that the recognized characters to be used for generating the name are recognized correctly, transmitting, without the approval by the user, the image data to the external apparatus before deleting the image data; and in a case where the period of storing the image data has exceeded the predetermined period without the name being approved by the user, and the first likelihood that the area corresponding to the recognized characters to be used for generating the name is a correct area as an area to be used for generation of the name does not exceed the predetermined value regardless of the second likelihood that the recognized characters to be used for generating the name are recognized correctly, sending an email to which the image data is attached to the user and deleting the image data that has exceeded the predetermined storage period without transmitting the image data to the external apparatus.

11. A method of processing information by an information processing apparatus, the method comprising:

generating a name using characters recognized in image data, assigning the name to the image data, and storing the image data;

making a request for approval by a user regarding the name, transmitting the image data to an external apparatus after the image data is approved by the user, and deleting the image data;

in a case where a period of storing the image data has exceeded a predetermined period without the name being approved by the user, and a first likelihood that an area corresponding to the recognized characters to be used for generating the name is a correct area as an area to be used for generation of the name exceeds a predetermined value regardless of a second likelihood that the recognized characters to be used for generating the name are recognized correctly, transmitting, without the approval by the user, the image data to the external apparatus before deleting the image data; and in a case where the period of storing the image data has exceeded the predetermined period without the name being approved by the user, and the first likelihood that the area corresponding to the recognized characters to be used for generating the name is a correct area as an area to be used for generation of the name does not exceed the predetermined value regardless of the second likelihood that the recognized characters to be used for generating the name are recognized correctly, sending an email to which the image data is attached to the user and deleting the image data that has exceeded the predetermined storage period without transmitting the image data to the external apparatus.

* * * * *